Nov. 29, 1960     S. H. BIRDSEYE ET AL     2,961,772
APPARATUS FOR MAKING THREE-DIMENSIONAL RELIEFS
Filed Jan. 5, 1956     2 Sheets-Sheet 1
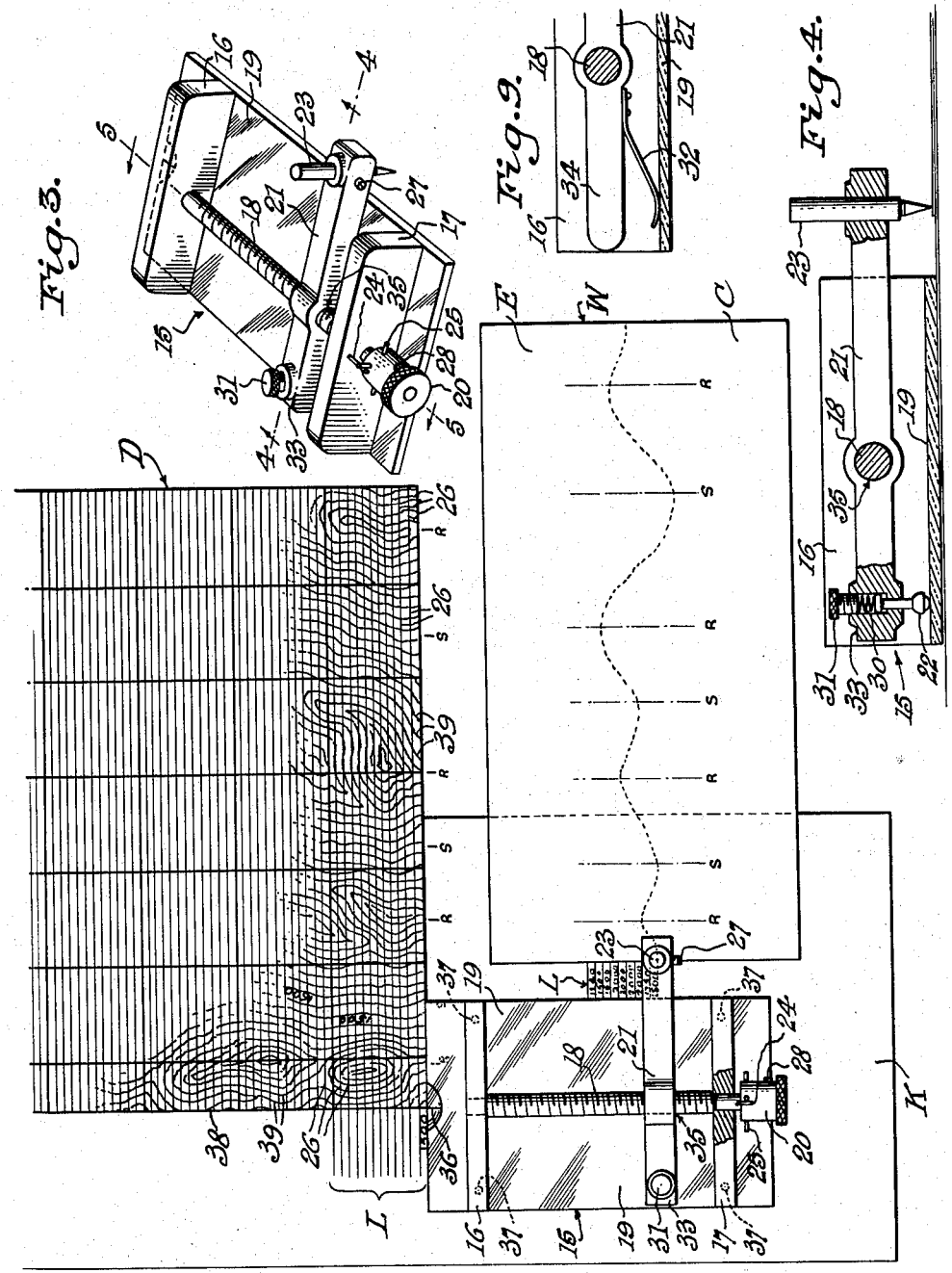
INVENTORS
SIDNEY H. BIRDSEYE
MAX C. TYLER
BY
ATTORNEYS

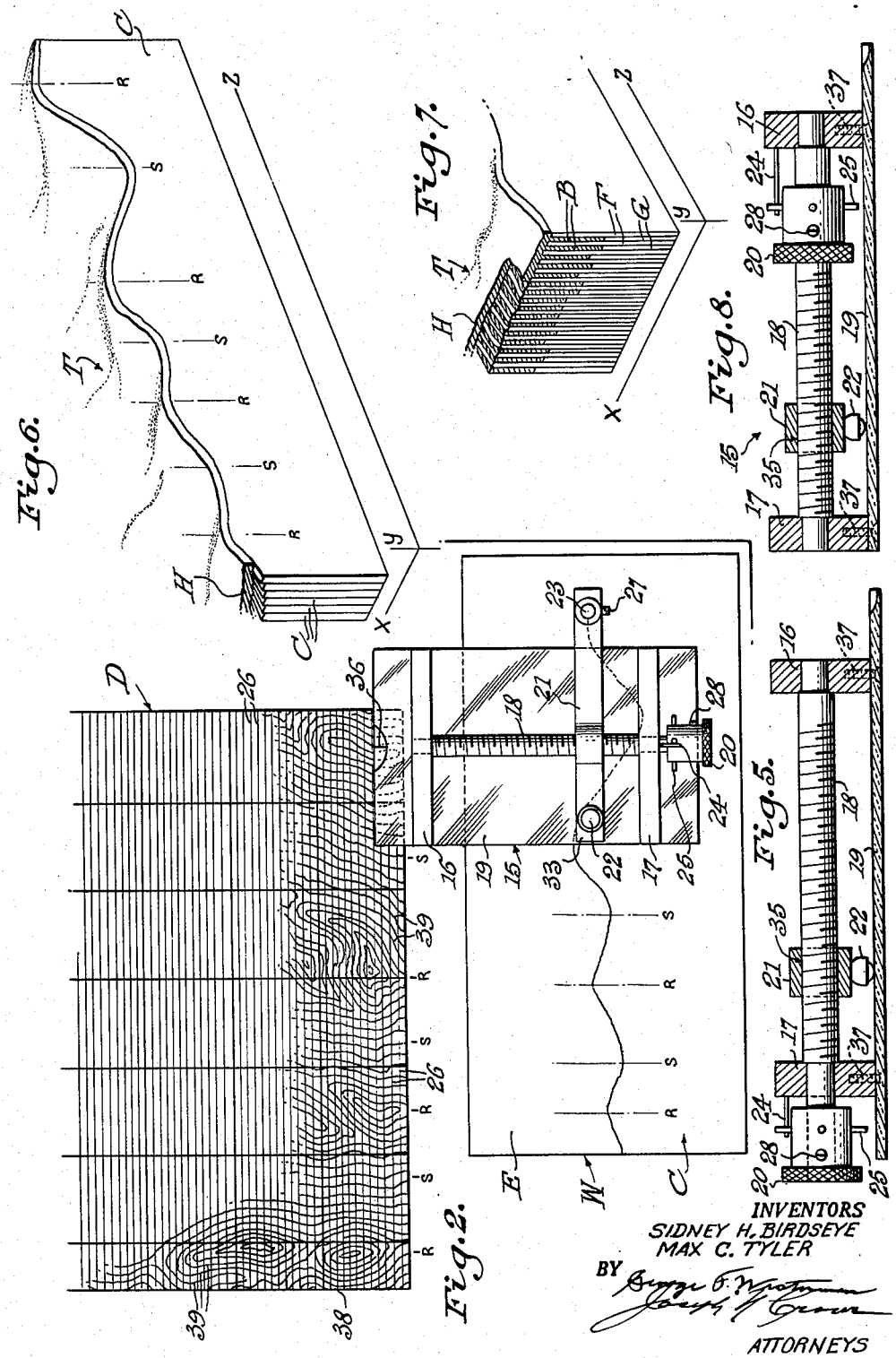

United States Patent Office 2,961,772
Patented Nov. 29, 1960

2,961,772
APPARATUS FOR MAKING THREE-DIMENSIONAL RELIEFS

Sidney H. Birdseye, 4202 Columbia Pike, Arlington 4, Va., and Max C. Tyler, Fort Edward, N.Y. (6 Sharon Chapel Road, Alexandria, Va.)

Filed Jan. 5, 1956, Ser. No. 557,614

3 Claims. (Cl. 33—189)

(Granted under Title 35, U.S. Code (1952), sec. 266)

The invention described herein may be manufactured and used by or for the Government for governmental purposes without the payment of any royalty thereon.

This invention relates generally to the art of making relief maps, and provides improved apparatus for the making of three-dimensional maps from two-dimensional topographic maps or graphs. While this problem is not new, its solution has not been successfully accomplished heretofore mechanically by profile methods. The prior failures have been due to the fact that the width of the contour lines, which are of the order of .003 inch–.005 inch wide on a plane two-dimensional topographic map, are so narrow that even though these lines of elevation may be represented in different colors, the available equipment has not been sensitive enough to transfer the different indicated elevations as a continuous profile on separate parallel templates of predetermined thickness representing a predetermined slice or cross section of the profile of the ground-terrain represented by the plane topographic map, after which successive templates and profiles may be consecutively laminated together and coated to give a continuous smooth three-dimensional relief map of existing ground-terrain under study.

This, however, is accomplishable by the present invention which effects a mechanical three-dimensional approximate integration in which a smooth, accurate, and true composite is available for study of ground areas taken from a two-dimensional plane topographic map. This type of three-dimensional relief map gives an accurate perspective layout for study of ground-terrain which may be useful in the studies of an area by soil conservation engineers, defense tactical forces, sanitary engineers, civil engineers, geologists, geographers, and others.

While the use of profiles in the construction of terrain models is not new, the improved plotting device of the present invention incorporates a new apparatus and procedure for quickly plotting profiles across a topographic map. More particularly, the present invention provides a mechanical profile plotting device for laying out profiles which are cut from cardboard, plastic sheets, or other suitable material and stacked consecutively side by side in vertical parallel planes and glued together in proper order to form a composite surface of the profile model. The final profile model is finished smooth by covering any stepped surfaces with a thin film of suitable sprayed thermosetting resin or covering the model with self-setting modeling material for use as a mold in mass production of relief maps or to which coloring and minute sculpturing techniques may be later applied to the hardened surface to enhance the ground or profile form of the completed relief model. The ordinary plane topographic map has the contour lines spaced thereon at regular vertical intervals and, assuming that the map has been properly made, the elevations along the contour lines will give accurate vertical data or exaggeration for making relief maps or three-dimensional graphs.

It is an object of the present invention to provide simple, light, portable, and inexpensive equipment for producing third-dimensional relief maps from two-dimensional or plane topographic maps without requiring a high degree of specialized skill.

Another object of the present invention is to provide a portable, dependable, accurate and fast-acting equipment for quickly converting plane topographic maps in the field to three-dimensional relief maps for military purposes.

Although this invention is illustrated in connection with relief map making, it is also applicable to the making of three-dimensional graphs, as will be more fully understood by reference to the accompanying drawings of the illustrative embodiments of the inventive process and apparatus by the subsequent drawings thereof. In such drawings—

Fig. 1 shows a plan view of the improved equipment in a beginning plotting position along a horizontal ruled guide line on a plane topographic map;

Fig. 2 is a plan view of the equipment shown in Fig. 1 in operating position as the device is about to complete a template;

Fig. 3 is a perspective view of the improved apparatus;

Fig. 4 is a transverse sectional view of the plotter device taken on line 4—4 of Fig. 3;

Fig. 5 is a transverse sectional view of plotter device taken on line 5—5 of Fig. 3;

Fig. 6 shows a partial perspective sectional view of the completed relief map in which the thickness of profiles used is equal to the distance between consecutive horizontal guide lines on topographic map D;

Fig. 7 shows a partial perspective sectional view of the completed relief map in which the thickness of profiles used is equal to one-half the distance between consecutive horizontal guide lines on a topographic map;

Fig. 8 shows a modification of the new and novel plotter device; and

Fig. 9 is a modified view of the resilient support means of the transcribing bar of plotter device.

Referring to Fig. 1 of the drawings, a specific embodiment of the invention will now be described in detail. A new and novel plotter device indicated by 15 comprises two bearing retaining members 16 and 17 interconnected by thread member 18 and flat base member 19 made of Lucite, plastic, aluminum, or other suitable material, the thread member 18 carrying a knurled spool member 20 and transcribing bar 21 intermediate its ends by thread means, said thread means consisting of a certain number of threads per inch length of member 18. Tracing bar 21 is supported intermediate its ends by a thread engaging bearing with member 18 in a manner so that one end of member 21 is resiliently supported by member 22 and the other end of member 21 retains and supports profile scriber 23 with scriber securing means 27 to maintain a predetermined and constant cutting pressure on the point of scriber 23 against template C, for selectively cutting or marking vertical exaggeration data upon profile member C as device 15 is moved upon a horizontal guide line passing across a designated graph or topographic map D. Both hands of the operator must be used in guiding the device along the ruled profile line on the map. The left hand operates the right and left motion of the screw drive, while the weight of the right hand resting on bearing retaining member 16 and profile scriber or cutter 23 is used to guide the device and exert added pressure downward on the pointed instrument, scriber or cutter 23. Template material W is ruled by ridge lines R and stream lines S from ridges and valleys of map D along a horizontal guide line 26 prior to transcribing each profile C as an aid to distinguishing the direction of slopes as an aid in plotting member C. Topographic map or graph D is ruled by horizontal guide lines 26 spaced apart in proportion to the thickness of profile members C. Member W shows a single original sheet of material from which basic relief template C is cut leaving mold template E which may be used in consecutive order and secured together to make a depression or female mold for making a basic relief map mold or three-dimensional graph. Member E may also be used as a separator or divider member G between consecutive members F in making a basic relief map T as shown in Fig. 7. An index ticker 24 is used by manual operator in rotating member 20 with thread member 18 to laterally position the scribing arm 21 of the plotter device 15 to accurately transfer vertical exaggeration data along a guide line 26 of topographic map D on material W in the form of template C of predetermined thickness to complete a slice of continuous relief contour or profile. Member 24 is fixedly and horizontally mounted on member 17 to wipe serrations or pins 25 to cause an audible click to inform the manual operator that a predetermined amount of elevation has been registered on profile member C. Serrations or pin members 25 are mounted on member 20 with their axes normal to axis of said member 20.

It is further seen that an angular movement of thread member 18 by manual operator through member 20 is accompanied by a lateral movement of member 21 by thread bearing means 35 along the axis of member 18 corresponding to the rotation of said member 18 caused by the manual operator turning knurled member 20 fixedly secured to member 18 by securing means 28. It may be seen that the bearings for member 18 in members 16 and 17 may be either of the nylon plastic type or of the metal ball, roller, or sleeve bearing types in which such bearings may further be of the lubricating or self-lubricating types in which small particles of graphite are embedded within the bearing member structure as a self-lubricating bearing means.

For the purposes of practicing our invention, certain lines or curves or systems of markings and profile arrangement and treatment have distinctive practical advantages over other methods in respects which will be made hereinafter more fully to appear.

The new inventive method of making relief maps, molds, or three-dimensional graphs from plane topographic maps or tabulated plane graphs of statistical data may be described generally in the following steps from an illustrated topographic map D in Figs. 1, 2, 6, and 7:

a. Ruling the plane topographic map D or graph with adjacent horizontal guide lines 26, along which profiles are to be plotted, the distance between said horizontal guide lines 26 being determined by the slice of relief profile or the thickness of the cardboard templates or desired accuracy of the completed relief map or three-dimensional graph T as shown in Figs. 6 and 7.

b. Rough ridge lining as indicated at R and stream lining as indicated at S on and along each guide line 26 of map D and transferring said ridge lines and stream lines to and along template material W as shown in Figs. 1 and 2 by letters R and S.

c. Scheduling elevations L on index strip K along the neat line 38 of map D and left edge of member C to indicate the elevations of the first contours to be met on each pass of the plotter as shown by Fig. 1.

d. Setting the first of said scheduled elevations for the chosen profile into the plotter device 15 and moving said device 15 manually along a selected horizontal guide line 26 while scribing a continuous relief template C from encountered contour lines 39 by the rotating of member 20 one click for each successive contour line 39 encountered during the pass of member 15 along each line 26. The direction of slope, either up or down, is controlled by manually changing the direction of rotation of the member 20 at each ridge line R or stream line S to accurately register the elevations of the contour lines crossed by guide line 26 along which a profile C is to be constructed as shown in Figs. 1 and 2. Member C may be cut to shape as the plotter 15 passes along member 26 or be cut to shape in a separate operation after plotter 15 has passed along member 26.

e. Cutting or gluing the transcribed, engraved or cut relief templates C in consecutive and sequential order, covering the top surface of the resulting model with a thin finished coating H of plasticene, thermosetting resin, modeling clay, or other suitable material shown in Figs. 6 and 7.

Referring to Fig. 4, the resilient support means of member 22 comprises coil spring member 30 and adjustable spring compression means 31 retained by thread means in member 33, which is a part of member 21 and profile scriber 23 is supported on the adjacent end of transcribing bar 21.

Referring to Fig. 5, member 37 secures base member 19 made of plastic, aluminum, or other suitable material, to members 16 and 17. Member 20 is secured to member 18 by member 28.

Fig. 6 shows the completed relief map, graph, or master mold T having x, y, and z coordinates and formed by properly arranging and gluing together of the several consecutive individual vertical templates C on a common base or plane xz. The ridge peaks are indicated also by vertical ridge lines marked R, and the valley streams are indicated by vertical lines marked S for first profile C. The film or coating H covers and blends the composite top edge profile surfaces of profiles C into a resulting uniform and accurate relief of the graph or map being modeled from a plane graph or topographic map D.

Referring to Fig. 7, member T represents a completed relief map, basic mold, or three-dimensional graph having x, y, and z coordinates and composed of a plurality of profile members F and divider members G which are each of a thickness of one-half of the distance between consecutive ruled horizontal guide lines 26 on topographic map D, in which finishing film or coating H covers profiles F and fills spaces between profiles F and tops of spacers G indicated as letter B in Fig. 7 to illustrate a uniform and accurate ground-terrain.

Fig. 8 shows another embodiment of the plotter device 15 for transcribing or cutting a relief template C or slice of relief surface from a plurality of contour lines 39 or a family of curves of graph from member D, as illustrated in Figs. 1 and 2, while plotter device 15 is traversing member D from left to right along a horizontal guide line 26 in which member 24 is mounted on member 16, and member 20 is mounted juxtaposed to the end of member 18 before it passes through a bearing means of member 16.

Referring to Fig. 9, tracing bar 21 terminates in member 34 and resilient spring support member 32 which contacts flat base member 19. Both hands of the operator must be used in guiding the device along the ruled profile line on the map. The left hand operates the right and left motion of the screw drive, while the weight of the right hand resting on bearing retaining member 16 and profile scriber or cutter 23 is used to guide the device and exert added pressure downward on the pointed instrument, scriber or cutter 23.

The plotting and assembling of the relief profiles C of a suitable thickness is generally illustrated by Figs. 1, 2, 6, and 7. In order to construct a relief map T of a given locality, reference must be had to a graph or topographic map D as shown in Fig. 1 upon which are drawn the contour and other natural features of the terrain represented. Topographic map D shows contour lines 39 which may be designated in any convenient increment of feet of elevation, as for example, 50 feet difference in elevation between contour lines. In making the relief map T from topographic map D, it is first necessary to select the scale of the relief map with reference to the scale of the topographic map. While the relief map may be made in any desired scale, the simplest scale is to make the scale of the relief map the same as that of the topographic map D. Horizontal guide lines 26 are ruled across topographic map D at intervals apart corresponding to the thickness of the template C being used. The semi-automatic profiling device 15, Fig. 1, is positioned with indicator line 36 to start tracing the profile along a horizontal guide line 26 at the bottom edge of the map or graph D after which support adjustable means 31 and scriber adjustable means 27 have been properly adjusted. Elevation of the first contour line to be encountered has been obtained from the numbered schedule along the left hand edge or neat line 38 of member D and the transscribing bar 21 positioned along the threaded member 18 to the corresponding setting on the vertical elevation or y coordinate of template C adjacent lower or second schedule L on member K or index strip. No additional elevation need be set into the device until it is moved up to the second horizontal guide line 26 from the bottom of the map preparatory to drawing or cutting the next profile C, after which the above procedural steps are repeated for each profile C.

It can be seen that each profile surface of template C corresponds to a slice of the terrain or relief with elevations along its corresponding horizontal guide line 26 on member D, or in other words, the thickness of template C may be used equal to the width of the spacing between consecutive guide lines 26 on a topographic map D. If template C is of a thickness equal to one-half the width of the spacing between consecutive guide lines 26, as indicated by a template F and thin alternate spacers G, Fig. 7, the spacer G being of the same thickness may be placed between each juxtaposed relief template F, which are all placed in consecutive vertical planes on a common datum plane xz, glued or secured together in continuous order, after which members G and the juxtaposed profiles F are sprayed or covered with a thin film or finish coating H of suitable modeling material, thermosetting resin, modeling clay, or plasticene. The resulting model can be used as a basic mold in mass production of relief maps or minutely sculptured and colored to an accurate scale in order to portray the desired cultural, commercial, and/or military annotations in the form of a relief map or three-dimensional graph T.

Various changes may be made in the form and arrangement of the exhibit and parts thereof without departing from the underlying idea or principles of our invention within the scope of the appended claims.

Having thus described our invention, what we claim as new and wish to secure by Letters Patent is:

1. A device for producing profile elements of a three-dimensional relief map from a topographic map having uniformly spaced parallel lines ruled thereon intersecting the ridge and stream contours of the topographic map, said device comprising a flat rectangular base, a first support member mounted adjacent to one of the two shorter sides of said rectangular base, a second support member mounted adjacent to the other of the two shorter sides of said rectangular base, a shaft extending longitudinally of said base and supported by said first and second support members above and parallel to said base, said shaft supported at one end thereof in a bearing in said first one of said support members and projecting through a bearing in the second one of said support members, said shaft having threads for the portion of the length thereof between said support members and unthreaded for the portion projecting through and beyond the bearing means in said second support member, a travelling bar of substantially uniform cross section and a length greater than the width of said base, said bar having an internally threaded bore engaging the threaded portion of said shaft for travel thereon in the longitudinal direction of said shaft, said travelling bar extending at one end thereof beyond one longitudinal edge of said base and having an opposite end thereof within the limits of the opposite longitudinal edge of said base, the end of said travelling bar extending beyond the longitudinal edge of said base including a bore for receiving a pointed instrument having its axis normal to the longitudinal axis of said travelling bar, said bore being normal to the direction of said internally threaded bore and means coacting with said bore for adjustably supporting a pointed instrument, the end of said travelling bar within the limits of the longitudinal edge of said base including support means carried by said bar and contacting said base to urge said bar in a clockwise direction about said shaft to apply a substantially constant pressure to said pointed instrument, a cylindrical spool secured to the unthreaded portion of said shaft projecting beyond the bearing means on said second support member for rotation of said shaft, said spool having a smooth-surfaced body portion and a knurled portion at one end thereof, said body portion facing said second support member, a plurality of circumferentially spaced pins carried by the smooth-surfaced body portion of said spool at the end thereof adjacent said second support member and projecting outwardly from the body portion of said spool, a flexible pin carried by said second support member and projecting therefrom in a direction facing the body portion of said spool for engagment with said circumferentially spaced pins and effective upon rotation of said shaft by said spool to produce an audible click, and an index mark inscribed in said base in a direction normal to the one of the two shorter sides of said rectangular base opposite said spool, said index mark and said flexible pin aligned with the longitudinal axis of said shaft whereby upon simultaneous movement of said base along the parallel ruled lines and registering said index mark with successive ridge and stream contours and rotation of said shaft in the clockwise and counterclockwise directions commensurate with the ridge and stream contours said pointed instrument is moved longitudinally of said shaft and said flexible pin produces audible clicks upon wiping contact with said circumferentially spaced pins to indicate the crossing of successive ridge and stream contours as a profile of the successive ridge and stream contours is traced by said pointed instrument.

2. A device as recited in claim 1 wherein said support means carried by said bar and contacting said base comprises a substantially S-shaped, resilient single leaf spring secured at one end thereof to the surface of said bar facing said base and having the free end thereof in contact with said base.

3. A device as recited in claim 1 wherein said support means carried by said bar and contacting said base comprises an aperture extending through said travelling bar in a direction parallel to the direction of said bore for receiving said pointed instrument and located adjacent the end of said travelling bar within the limits of a longitudinal edge of said base, said aperture having a uniform width for a portion of the length thereof and a reduced width for the remaining portion of the length thereof, the portion having the reduced width being adjacent said base and the junction of said uniform width and said reduced width portions forming a shoulder within said aperture, the uniform width portion of said aperture being internally threaded, a spherical member received in a cup-shaped member having a rod integrally joined thereto, said rod received in said reduced width portion of said aperture and having an enlarged portion at the end opposite said cup-shaped member for seating on said shoulder within said aperture, a helical spring within said uniform width portion of said aperture intermediate said enlarged portion of said rod and an externally threaded adjusting member received within the internally threaded uniform width portion of said aperture, said helical spring contacting said threaded adjusting member and the enlarged portion of said rod whereby said spring may be compressed to impart a force varying in amount to maintain contact of said rod, cup-shaped member and spherical member with said base to urge said bar in a clockwise direction about said shaft to provide a predetermined force on the end of said bar projecting beyond a longitudinal edge of said base and said pointed instrument carried thereby.

References Cited in the file of this patent

UNITED STATES PATENTS

| Number | Name | Date |
|---|---|---|
| 473,901 | Blanther | May 3, 1892 |
| 508,453 | Waldie | Nov. 14, 1893 |
| 999,412 | Speer | Aug. 1, 1911 |
| 1,302,645 | Emery | May 6, 1919 |
| 1,351,392 | Manheimer | Aug. 31, 1920 |
| 1,393,255 | Wenschow | Oct. 11, 1921 |
| 1,438,694 | Burton | Dec. 12, 1922 |
| 2,138,024 | Cheesman | Nov. 29, 1938 |
| 2,189,592 | Perera | Feb. 6, 1940 |
| 2,356,525 | Maness | Aug. 22, 1944 |
| 2,556,798 | Concordet | June 12, 1951 |
| 2,560,850 | Day | July 17, 1951 |
| 2,589,923 | Braund | Mar. 18, 1952 |
| 2,734,272 | Brown | Feb. 14, 1956 |

FOREIGN PATENTS

| 332,359 | Germany | Jan. 31, 1921 |